US008667929B2

(12) United States Patent
Sullivan et al.

(10) Patent No.: US 8,667,929 B2
(45) Date of Patent: Mar. 11, 2014

(54) ANIMAL SELF-CARE DEVICE

(76) Inventors: Molly Sullivan, Pittsfield, MA (US);
Jamie Dickhaus, Pittsfiled, MA (US);
Caitlin White, Pittsfield, MA (US)

(*) Notice: Subject to any disclaimer, the term of this patent is extended or adjusted under 35 U.S.C. 154(b) by 669 days.

(21) Appl. No.: 11/954,099

(22) Filed: Dec. 11, 2007

(65) Prior Publication Data

US 2009/0145370 A1 Jun. 11, 2009

(51) Int. Cl.
*A01K 13/00* (2006.01)
(52) U.S. Cl.
USPC .......................................... 119/621; 119/706
(58) Field of Classification Search
USPC ......... 119/621, 622, 623, 627, 628, 706, 174, 119/629; 15/160, 161, 104.92
See application file for complete search history.

(56) References Cited

U.S. PATENT DOCUMENTS

| | | | | |
|---|---|---|---|---|
| 2,338,836 A | * | 1/1944 | Chrisman | 132/121 |
| 2,852,793 A | * | 9/1958 | Shelton | 15/104.92 |
| 3,416,178 A | * | 12/1968 | James | 15/104.92 |
| 3,482,548 A | * | 12/1969 | Burns | 119/706 |
| 3,599,606 A | * | 8/1971 | Hayward | 119/174 |
| 3,690,331 A | * | 9/1972 | Messer | 132/120 |
| 3,752,125 A | * | 8/1973 | Jackson | 119/620 |
| 3,973,286 A | * | 8/1976 | Logan | 15/88.3 |
| 4,532,668 A | * | 8/1985 | Slonicki | 15/104.92 |
| 4,872,422 A | * | 10/1989 | Della Vecchia | 119/621 |
| 4,926,796 A | * | 5/1990 | Leopold | 119/602 |
| 5,038,716 A | * | 8/1991 | Olson | 119/706 |
| 5,437,075 A | * | 8/1995 | Peake | 15/161 |
| 5,595,141 A | * | 1/1997 | Udelle et al. | 119/706 |
| 5,628,282 A | * | 5/1997 | Udelle | 119/609 |
| 5,960,745 A | * | 10/1999 | Boyland | 119/613 |
| 5,983,433 A | * | 11/1999 | Chapman | 15/104.92 |
| 6,125,508 A | * | 10/2000 | Formenti | 16/335 |
| 6,283,930 B1 | * | 9/2001 | Purvis et al. | 601/137 |
| 7,198,048 B2 | * | 4/2007 | Johnson | 132/125 |
| 7,322,949 B2 | * | 1/2008 | Shimizu | 601/90 |
| D572,009 S | * | 7/2008 | Meyhew | D4/117 |
| 2007/0039558 A1 | * | 2/2007 | Hensley | 119/621 |

FOREIGN PATENT DOCUMENTS

FR 2563969 A1 * 11/1985 ............ A01K 13/00

* cited by examiner

*Primary Examiner* — Kimberly Berona
*Assistant Examiner* — Danielle Clerkley
(74) *Attorney, Agent, or Firm* — Fish & Richardson P.C.

(57) ABSTRACT

An animal self-care device including a base, at least one base rubbing surface disposed on the base for contact by an animal, and at least one arm having first and second ends. The second end of the arm is pivotally attached to the base to pivot among a stored position and a deployed position. At least one arm rubbing surface is disposed on the arm for contact by an animal.

22 Claims, 8 Drawing Sheets

ANIMAL SELF-CARE DEVICE

TECHNICAL FIELD

This disclosure relates to animal self-care devices.

BACKGROUND

Animal self-care devices allow animals to self-administer one or more care procedures (e.g. grooming). One example of an animal self-care device is a scratching post for cats which provides an acceptable place for cats to scratch (versus furniture). Generally, a scratching post includes a wooden post optionally covered with a softer material that cats find inviting. Cats have a natural urge to scratch to help remove old material from their claws as well as to mark their territory with scent glands in their paws.

SUMMARY

In one aspect, an animal self-care device includes a base having first and second ends, at least one base rubbing surface disposed on the base for contact by an animal, and at least one arm having first and second ends. The second end of the arm is pivotally attached to the base (e.g. to the first end of the base) to pivot among a stored position and a deployed position. At least one arm rubbing surface is disposed on the arm for contact by an animal.

In another aspect, a kit for animal self-care includes the combination of a base, at least one base rubbing surface for removable attachment to the base and for contact by an animal, at least one arm configured for pivotal attachment to the base, and at least one arm rubbing surface for removable attachment to the arm and for contact by an animal. Once attached to the base, the arm pivots among a stored position and a deployed position. In some implementations, the kit includes a stand for attachment to the base, the stand elevating the base above a floor surface.

Implementations of the disclosure may include one or more of the following features. In some implementations, the base is configured for mounting to a wall (e.g. with the first end above the second end). The base may also be placed horizontally on a surface. The rubbing surface may include a carpet, brush, curry comb, and/or an upholstered cushion. In some examples, the rubbing surface defines crenulations and/or other protrusions. In some implementations, the rubbing surface is removably attached to the device. The base defines at least one cartridge receptacle configured to receive the removably attachable rubbing surface configured as a cartridge, with the received rubbing surface cartridge sliding into the cartridge receptacle. Similarly, the arm defines at least one cartridge receptacle configured to receive the removably attachable rubbing surface configured as a cartridge, with the received rubbing surface cartridge sliding into the cartridge receptacle.

The arm defines an arcuate shape, in some instances, and a substantially L-shape, in other instances. The arm may be lockable among multiple deployed positions. The animal self-care device may include at least one arm pivotally attached to the second end of the base, the arm pivoting among a stored position and a deployed position. In some implementations, the arm is removably attached to the base, allowing interchangeability of arms on the device. For example, arms of different shapes, sizes, and/or other configurations are interchangeable on the base. The arm may be biased toward the stored position. In some examples, a bi-stable spring disposed on the arm biases the arm among both the stored position and the deployed position. The arm defines a toy attachment feature (e.g. hole or hook) at the first end of the arm to receive an affixed toy.

In some implementations, the animal self-care device includes a stand attached to the second end of the base, holding the first end of the base above the second end of the base. The stand includes a stand base and a stand support extending upwardly from the stand base. The stand support is configured to receive the second end of the base and is telescopically configured for variable height adjustment. In some examples, the stand includes a stand base configured to receive the second end of the base and at least two legs extending downwardly from the stand base. The legs elevate the base above a floor surface.

The details of one or more implementations of the disclosure are set fourth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Animals, especially pets or farm animals, routinely need care. Many animals groom themselves, but may need additional assistance to achieve cleanliness and/or appearance levels acceptable by their owners. For example, dogs and horses need to be brushed periodically for fur maintenance. This disclosure provides an animal self-care device that advantageously allows animals to perform care procedures on themselves, thus decreasing an owner's involvement in animal care tasks, and also operates for animal preoccupation and enjoyment.

Figure 1:
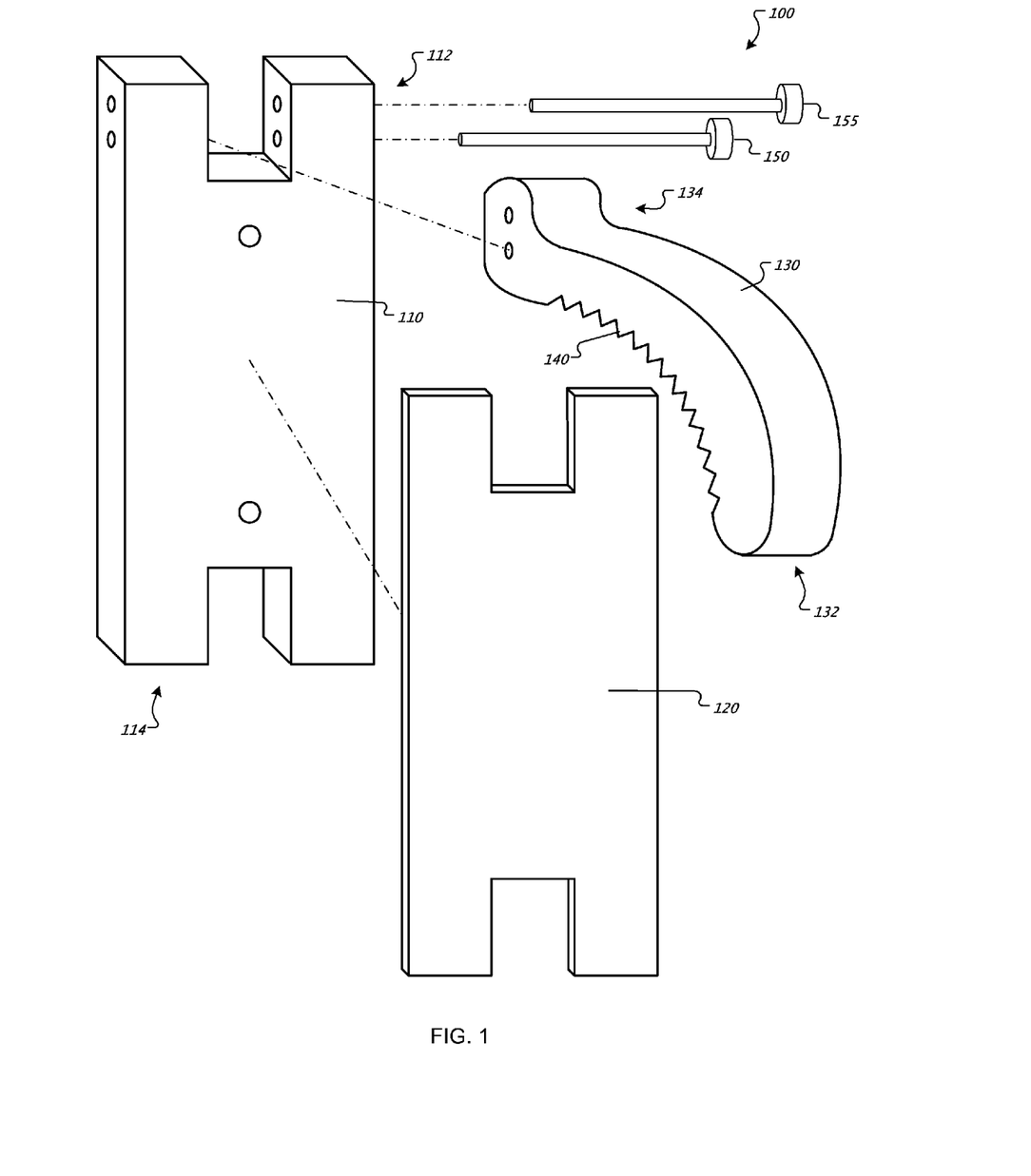
FIG. 1 is an exploded view of an animal self-care device.
Figure 2:
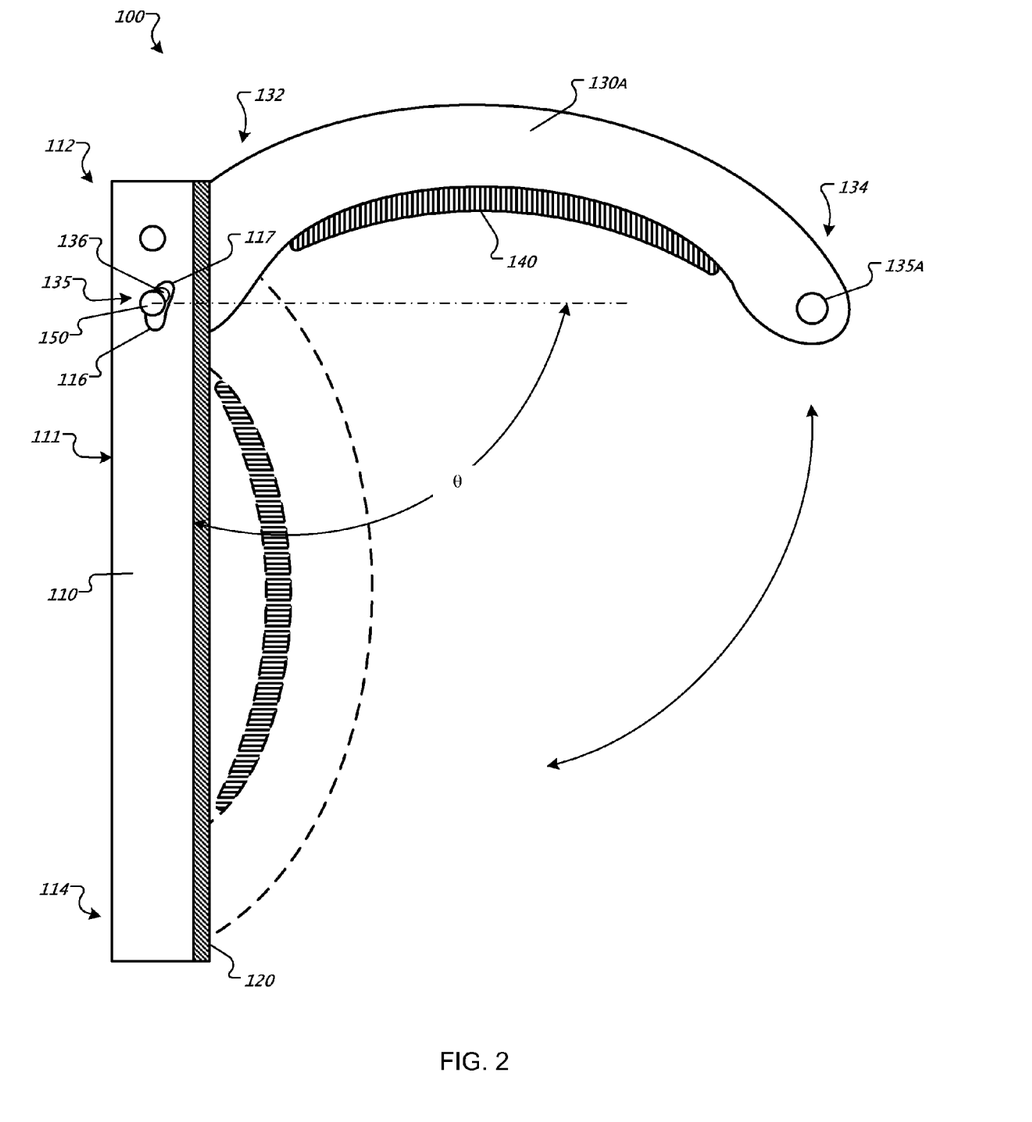
FIG. 2 is a side view of an animal self-care device having an arm pivotable among stored and deployed positions.

Referring to FIGS. 1-2, an animal self-care device 100 includes a base 110 having first and second ends 112 and 114, respectively, and at least one base rubbing surface 120 disposed on the base 110 for contact by an animal. The animal self-care device 100 also includes at least one arm 130 having first and second ends 132 and 134, respectively. The second end 134 of the arm 130 is pivotally attached to the first end 112 of the base 110, such that the arm 130 pivots among a stored position and a deployed position. An angle θ between the arm 130 and the base 110 is smaller for the stored position than the deployed position. In the examples shown, the arm 130 is positioned against the base 110 in the stored position. At least one arm rubbing surface 140 is disposed on the arm 130 for contact by an animal.

The animal self-care device 100 may be sized to accommodate different classes of animals, such as small pets (e.g. hamsters or gerbils), medium pets (e.g. cats and dogs), and large pets (e.g. horses). Similarly, the animal self-care device 100 is fabricated from materials appropriate to accommodate the stresses and moments about the base 110 resulting from forces on the attached arm 130. For example, an animal self-care device 100 sized for a small pet will not experience the same stress levels as an animal self-care device 100 sized for a large pet, such as a horse. Accordingly, an animal self-care device 100 sized for a small pet may be made of plastic, while an animal self-care device 100 sized for a large pet, such as a horse, may be made of steel, aluminum, an alloy, or a carbon fiber composite.

In some implementations, a removable pivot pin 150 pivotally secures the second end 134 of the arm 130 to the first end 112 of the base 110. In other implementations, pivot protrusions extend laterally from the arm 130 and are received by pivot receptacles defined by the base 110. The pivot protrusions of the arm 130 snap into the pivot receptacles defined by the base 110. A removable locking pin 155 locks the arm 130 in the deployed position. In some implementations, the arm 130 is lockable in multiple deployed positions to accommodate animals of different sizes or statures. In one example, the arm 130 is lockable at an angle θ with respect to the base 110 of about 15°, 45°, 60°, and 90°. Lower deployed angles (e.g. 15°-45°) of the arm 130 allow an animal to rub its head or other parts on the second end 134 of the arm 130 for more focused or localized rubbing. In some implementations, the arm 130 is biased toward the stored or deployed positions. In one example, a bi-stable spring 135 is disposed on the arm 130, biasing the arm 130 among both the stored and deployed positions, as shown in FIG. 2. In the example shown, the bi-stable spring 135 includes the cooperation of the base 110, which defines a stored recess 116 and a deployed recess 117, both configured to receive a spring element 136, which moves radially from the pivot pin 155, which is stationary with the base 110. The spring element 136 urges the arm 130 to move toward either the stored position or the deployed position. The base 110 may define additional recesses for receiving the spring element 136 to hold the arm 130 at various angles, θ, with respect to the base 110. Any other suitable multi-stable spring may be used to implement biasing the arm 130 among multiple positions with respect to the base 110.

Figure 3:
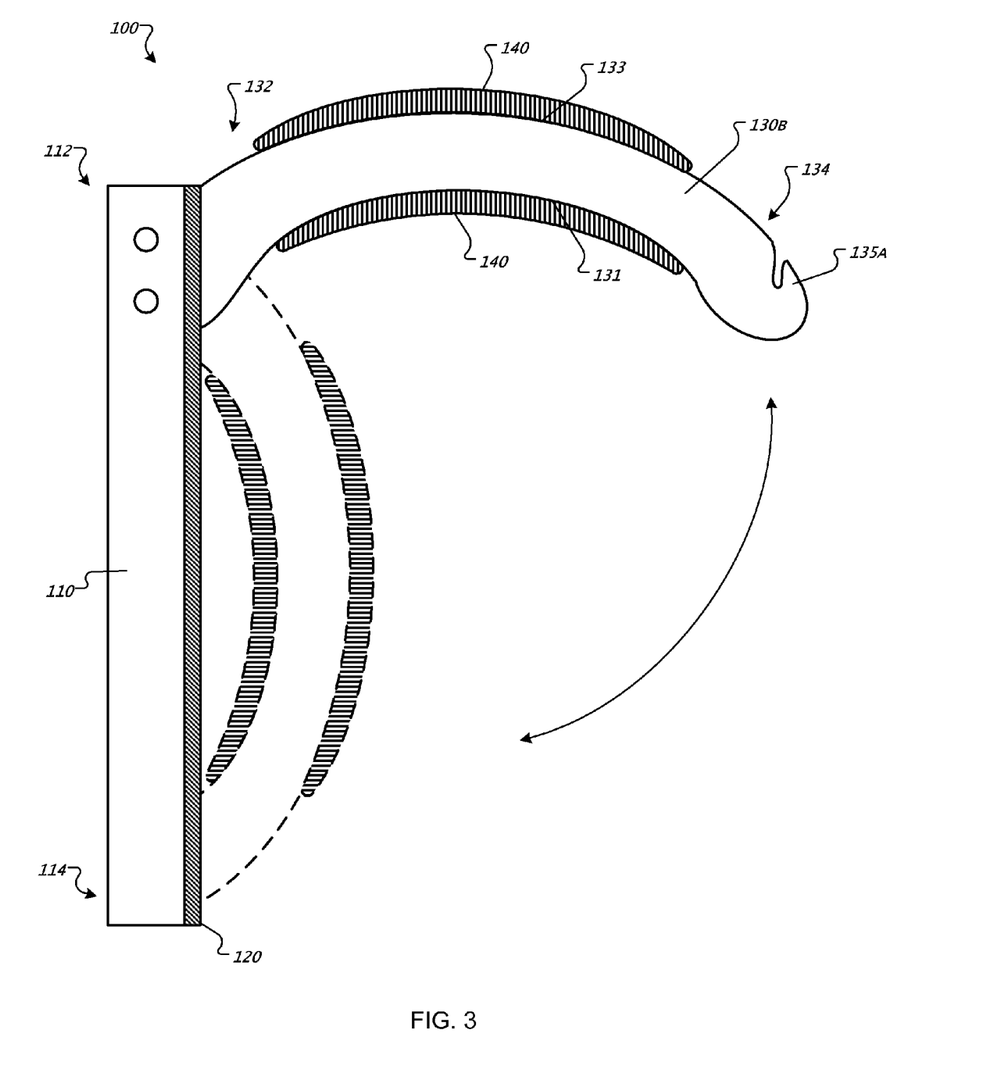
FIG. 3 is a side view of an animal self-care device having an arm with rubbing surfaces on inward and outward surfaces of the arm.
Figure 4:
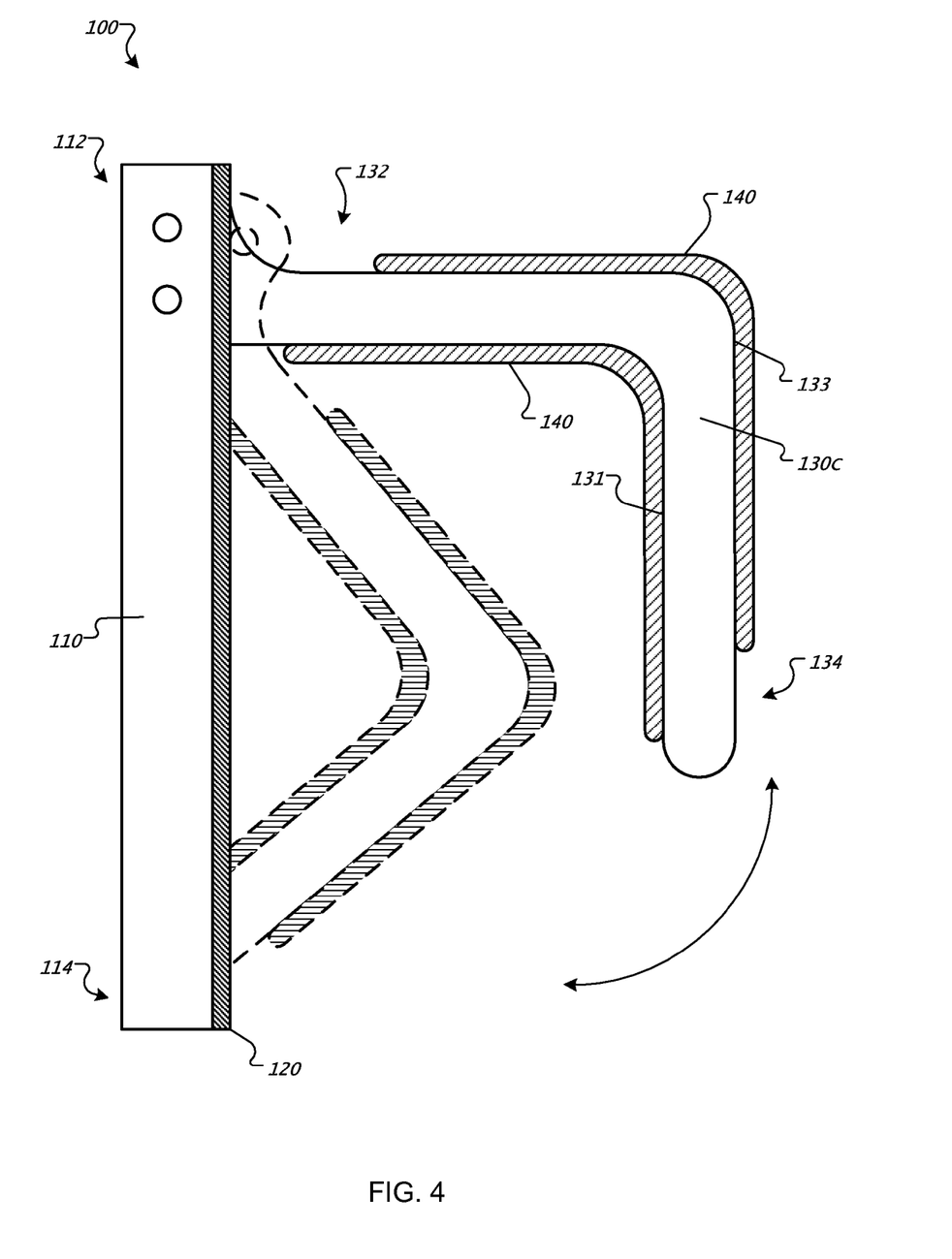
FIG. 4 is a side view of an animal self-care device having a substantially "L" shaped arm with rubbing surfaces disposed on both inward and outward surfaces of the arm.

Referring to FIGS. 2-4, the removable pivot pin 150 allows the arm 130 to be removed from the base 110 for interchangeability with other arms 130 of different sizes, shapes, or rubbing surface configurations. FIG. 2 illustrates the animal self-care device 100 with an arcuate arm 130A defining a toy attachment feature 135A (e.g. an aperture). The base rubbing surface 120 may be used for side animal body contact and/or as a scratching surface for animal claws. FIG. 3 illustrates the animal self-care device 100 with an arcuate arm 130B having an arm rubbing surface 140 disposed on both inward and outward surfaces 131 and 133, respectively, of the arm 130 for animal contact in both the stored and deployed positions. The arm rubbing surface 140 disposed on the inward surface 131 of the arm 130B is primarily used for dorsal animal body contact. The arm rubbing surface 140 disposed on the outward surface 133 of the arm 130B is primarily used for side animal body contact and/or as a scratching surface for an animal's claws while in the stored position. The arm 130B also defines a toy attachment feature 135B in the form of a hook shape. The toy attachment feature 135A, 135B is particularly useful for cat toys, which may be enjoyed by a cat (or other animal) when the arm 130A, 130B is in the stored or deployed positions. FIG. 4 illustrates the animal self-care device 100 with a substantially "L" shaped arm 130C having an arm rubbing surface 140 disposed on both inward and outward surfaces 131 and 133, respectively, of the arm 130C for contact by an animal in both the stored and deployed positions. The deployed substantially "L" shaped arm 130C allows an animal to rub both sides of its body as well as its back while passing under/through the animal self-care device 100.

The rubbing surfaces 120 and 140 may be defined by and integral with the base 110 and the arm 130, respectively, or removable for serviceability. In the example shown in FIG. 1, the base rubbing surface 120 is removably attached to the base 110, while the arm rubbing surface 140 is defined by and integral with the arm 130 as crenulations. The rubbing surfaces 120 and 140 may be secured to the device 100 by hook and loop fasteners, adhesive, tape, clips, elastic bands, snaps, staples, screws or any other suitable connector or fastener.

Figure 5:
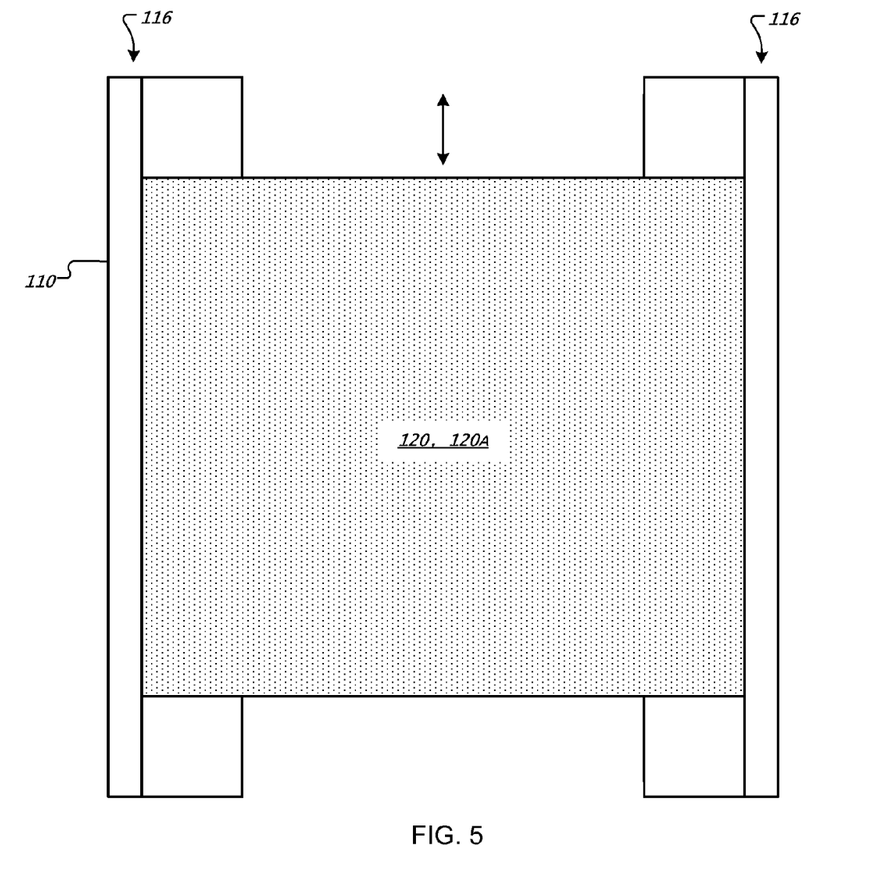
FIG. 5 is a front view of a base of an animal self-care device with a rubbing surface cartridge held in a cartridge receptacle defined by the base.
Figure 6:
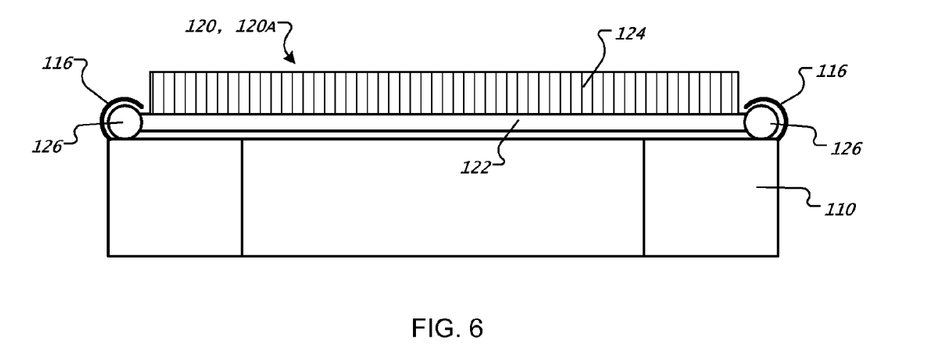
FIG. 6 is a top view of a base of an animal self-care device with a rubbing surface cartridge held in a cartridge receptacle defined by the base.

In the examples illustrated in FIGS. 5-6, the base 110 defines a cartridge receptacle 116 configured to releasably receive the base rubbing surface 120 configured as a cartridge 120A. The rubbing surface cartridge 120A includes a cartridge base 122 configured to be received by the cartridge receptacle 116 of the base 110 and a contact surface 124 for use by an animal. In one example, the cartridge base 122 defines cylindrical longitudinal edges 126 sized to be slidably received by the cartridge receptacle 116 of the base 110.

Figure 7:
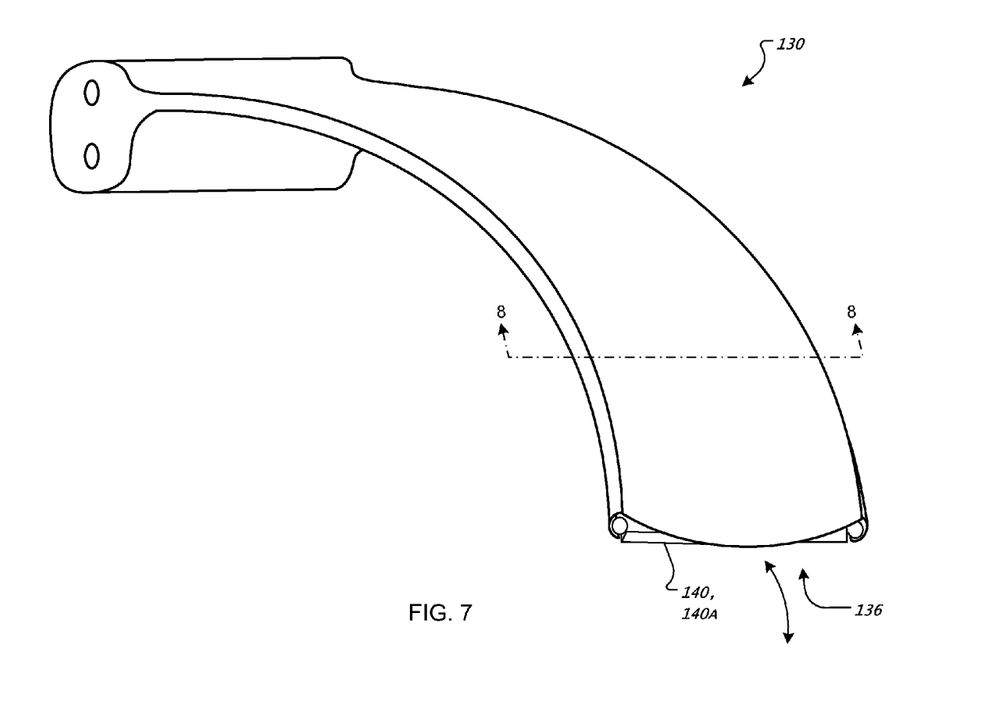
FIG. 7 is a perspective view of an arm with a rubbing surface cartridge held in a cartridge receptacle defined by the arm.
Figure 8:
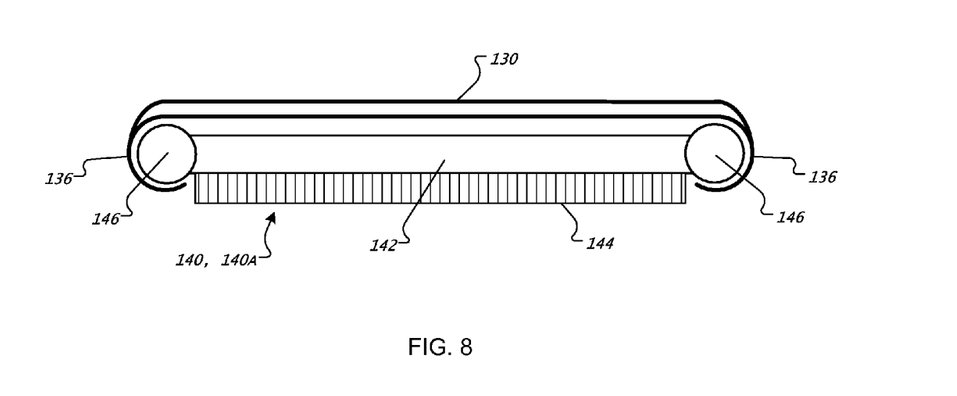
FIG. 8 is a section view of the arm of FIG. 7.

In the examples illustrated in FIGS. 7-8, the arm 130 defines a cartridge receptacle 136 configured to releasably receive the arm rubbing surface 140 configured as a cartridge 140A. The rubbing surface cartridge 140A includes a cartridge base 142 configured to be received by the cartridge receptacle 136 of the arm 130 and a contact surface 144 for use by an animal. In one example, the cartridge base 142 defines cylindrical longitudinal edges 146 sized to be slidably received by the cartridge receptacle 136 of the arm 130. The cartridge receptacle 136 defines detents or protrusions to secure the received cartridge 140A. The removable cartridges 120A, 140A provide serviceability and interchangeability of the rubbing surfaces 120, 120A, 140, 140A of the animal self-care device 100.

In some implementations, the rubbing surfaces 120, 120A and 140, 140A are interchangeable between the base 110 and the arm 130. A kit for the animal self-care device 100 includes the base 110 and multiple arms 130, 130A, 130B, 130C for attachment to the first end 112 and/or the second end 114 of the base 110. The kit also includes multiple rubbing surfaces 120, 140 configured for interchangeable attachment to the base 110 and the arm(s) 130. Each rubbing surface 120, 140 may be configured as a brush (haring various bristle lengths), curry comb, straight comb, carpet (e.g. Berber or shag), or an upholstered cushion, which may have a variety of decorative design appearances. A cat configuration of the rubbing surface 120, 140 includes cat nip treated carpet. A horse configuration of the rubbing surface 120, 140 includes a curry comb, and a dog configuration of the rubbing surface 120, 140 may include a brush.

The base 110 is configured for mounting to a wall with the first end 112 above the second end 114. In some examples, the base 110 defines one or more holes for receiving mounting screws therethrough. In situations where the animal is confined to a fish tank (e.g. as with a hamster or gerbil), a suction cup or magnet (having a corresponding receiving magnet or metallic object) is disposed on the back side 111 of the base 110 for mounting the base 110 along a wall of the tank. A mounting pad is applied to the back side 111 of the base 110 to prevent damage to the mounting surface. The back side 111 of the base 110 may also be placed on a horizontal surface (e.g. floor) with the arm 130 deployed for an animal to rub its belly along the base rubbing surface 120 and its side against the arm rubbing surface 140 while passing over the base 110. A friction enhancing material, such as rubber, is applied to the back side 111 of the base 110 to prevent slippage along of the horizontal surface.

Figure 9:
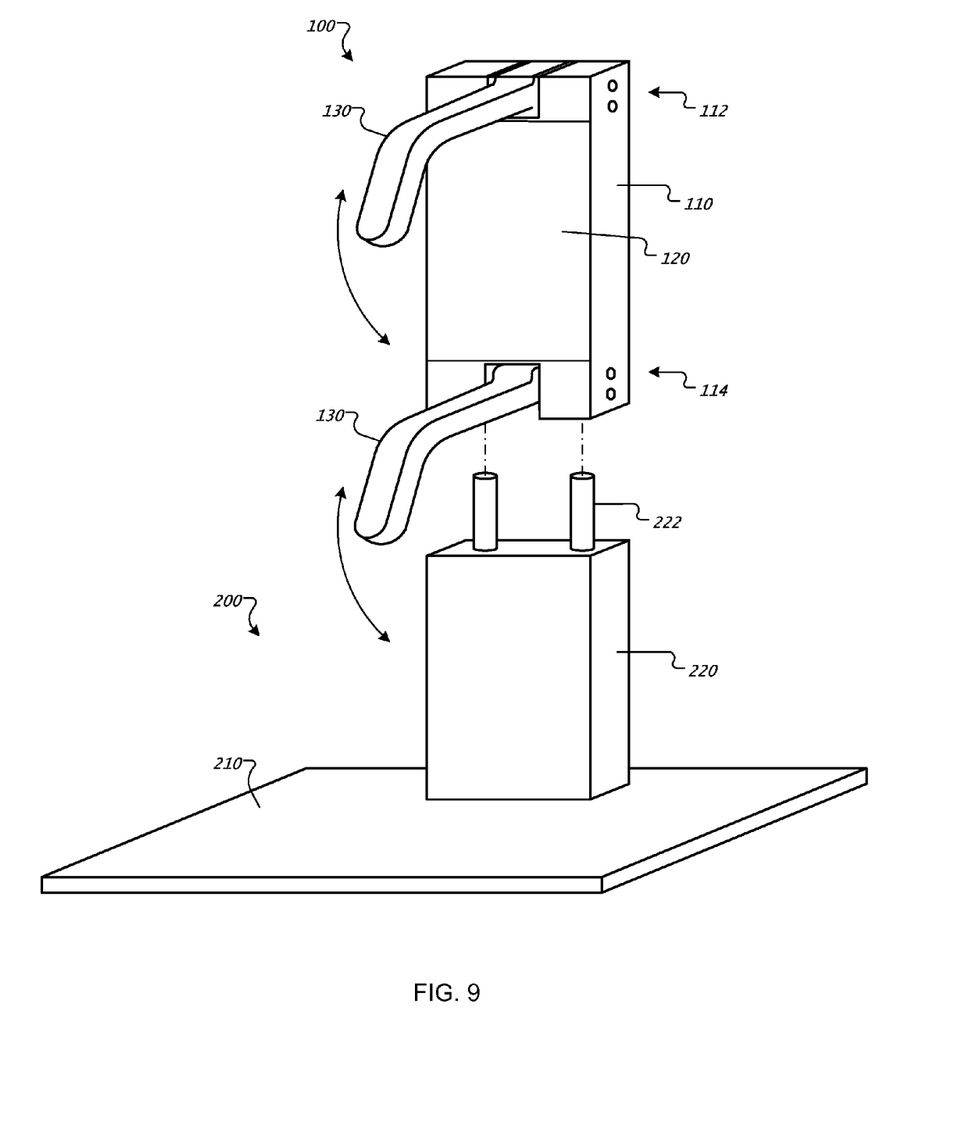
FIG. 9 is a perspective view of an animal self-care device having two arms and mounted on a stand.
Figure 10:
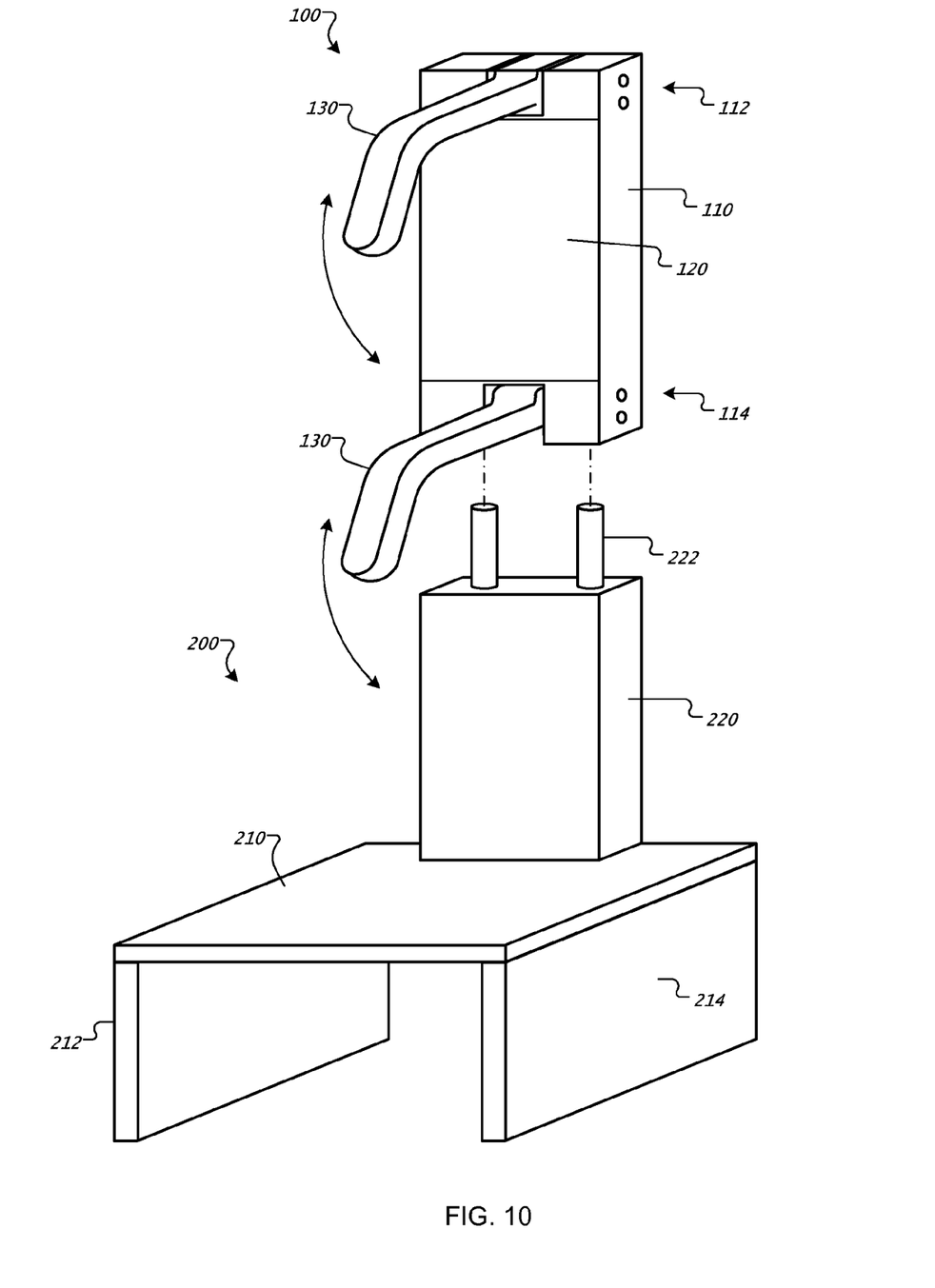
FIG. 10 is a perspective view of an animal self-care device having two arms and mounted on a stand with legs.

Referring to FIG. 9, in some examples, the animal self-care device 100 includes a stand 200 attached to the second end 114 of the base 110 to hold the first end 112 of the base 110 above the second end 114 of the base 110. In some implementations, the stand 200 includes a stand base 210 and a stand support 220 extending upwardly from the stand base 210 with the stand support 220 configured to receive the animal self-care device 100. In the example shown, two protrusions 222 extend upwardly from the stand support 220 and are received by corresponding stand protrusion receptacles (not shown) defined by the base 110. In other examples, the base 110 of the animal self-care device 100 is secured by one or more fasteners (e.g. screws, hook and loop, tape, etc.) to the stand support 220. In some implementations, the stand support 220 is telescopic or otherwise operable for variable height adjustment. In the example illustrated in FIG. 10, at least two legs 212 and 214 extend downwardly from the stand base 210 to elevate the stand base 220 above a floor surface. The elevated stand base 220 allows animals to pass underneath or provides an area for underneath storage.

A number of implementations have been described. Nevertheless, it will be understood that various modifications may be made without departing from the spirit and scope of the disclosure. Accordingly, other implementations are within the scope of the following claims.

What is claimed is:

1. An animal self-care device comprising:
a base having an inward surface and an outward surface, wherein a rubbing surface for contact by an animal is disposed on the outward surface of the base, and wherein the inward surface of the base is configured for mounting to a stationary surface, the base defining a stored recess and a deployed recess;
an arm extending from a first end to a second end, the first end pivotally attached to the base such that the arm is movable between a stored position in which the second end of the arm is in contact with the base to a deployed position in which an angle between the base and the arm is between 15 and 90 degrees, and having two rubbing surfaces for contact by an animal, the two rubbing surfaces exposed in opposite directions;
a bi-stable spring disposed on the arm, the bi-stable spring biasing the arm among the stored position and the deployed position such that the stored recess receives a spring element when the arm is in the stored position and the deployed recess receives the spring element when the arm is in the deployed position;
at least one of the base and the at least one arm defining at least one cartridge receptacle configured to receive one of the rubbing surfaces; and
at least one rubbing surface being configured as a cartridge and defining at least one cylindrical longitudinal edge sized to be slidably received by the at least one cartridge receptacle.

2. The animal self-care device of claim 1, wherein the base is configured for mounting to a wall.

3. The animal self-care device of claim 1, wherein at least one rubbing surface comprises carpet.

4. The animal self-care device of claim 1, wherein the rubbing surface comprises a brush.

5. The animal self-care device of claim 1, wherein the rubbing surface comprises a curry comb.

6. The animal self-care device of claim 1, wherein the rubbing surface comprises an upholstered cushion.

7. The animal self-care device of claim 1, wherein the rubbing surface defines crenulations.

8. The animal self-care device of claim 1, wherein at least one rubbing surface is removably attached to the device.

9. The animal self-care device of claim 8, wherein the base defines at least one cartridge receptacle configured to receive the removably attachable rubbing surface configured as a cartridge, the received rubbing surface cartridge sliding into the cartridge receptacle.

10. The animal self-care device of claim 8, wherein the arm defines at least one cartridge receptacle configured to receive the removably attachable rubbing surface configured as a cartridge, the received rubbing surface cartridge sliding into the cartridge receptacle.

11. The animal self-care device of claim 1, wherein the arm defines an arcuate shape.

12. The animal self-care device of claim 1, wherein the arm defines a substantially L shape.

13. The animal self-care device of claim 1, wherein the arm is lockable among multiple deployed positions.

14. The animal self-care device of claim 1, wherein the arm is removably attached to the base, allowing interchangeability of arms on the device.

15. The animal self-care device of claim 1, wherein the arm is biased toward the stored position.

16. The animal self-care device of claim 1, wherein the arm defines a toy attachment feature at the second end of the arm.

17. The animal self-care device of claim 1, further comprising a stand attached to the base, elevating the base above a floor surface.

18. The animal self-care device of claim 17, wherein the stand comprises:
a stand base; and
a stand support extending upwardly from the stand base and configured to receive the base, the stand support telescopically configured for variable height adjustment.

19. The animal self-care device of claim 17, wherein the stand comprises:
a stand base configured to receive the base; and
at least two legs extending downwardly from the stand base, the legs elevating the base above a floor surface.

20. The animal self-care device of claim 1, wherein the inward surface of the base faces opposite the outward surface of the base.

21. The animal self-care device of claim 1, comprising a mounting pad applied to the inward surface of the base.

22. The animal self-care device of claim 1, comprising a friction enhancing material applied to the inward surface of the base.

\* \* \* \* \*